United States Patent [19]

Tsuboi

[11] Patent Number: 5,427,454
[45] Date of Patent: Jun. 27, 1995

[54] LINEAR ROLLER BEARING WITH RACK AND PINION

[75] Inventor: Takaaki Tsuboi, Machida, Japan
[73] Assignee: Nippon Thompson Co., Ltd., Tokyo, Japan
[21] Appl. No.: 304,196
[22] Filed: Sep. 12, 1994
[30] Foreign Application Priority Data Sep. 27, 1993 [JP] Japan .................. 5-260459

[51] Int. Cl.⁶ .............................................. F16C 29/04
[52] U.S. Cl. .......................................... 384/47; 384/51
[58] Field of Search .................. 384/50, 51, 57, 47, 384/18; 389/49

[56] References Cited

U.S. PATENT DOCUMENTS

| 2,294,665 | 9/1942 | Jackson | 384/47 |
| 3,857,618 | 12/1974 | Hager et al. | 384/18 |
| 4,524,671 | 6/1985 | Bender et al. | 384/51 X |
| 4,697,935 | 10/1987 | Yasui | 384/47 |

FOREIGN PATENT DOCUMENTS 62-89523  6/1987  Japan .

Primary Examiner—Thomas R. Hannon
Attorney, Agent, or Firm—Browdy and Neimark

[57] ABSTRACT

The linear roller bearing comprises: a pair of ways with their raceway grooves facing each other; a cage disposed between the ways; cylindrical rollers held in the cage between the ways; a rack installed in a cutter escape groove formed in each raceway groove of the way; and a pinion in mesh with the rack and supported in the cage. The meshing between the rack and pinion of the linear roller bearing eliminates the possibility of the cage coming off the ways, thus allowing the ways to be controlled to move reliably and smoothly relative to each other.

10 Claims, 4 Drawing Sheets

(A)　　　　(B)

(A)　　　　(B)

and mounting holes $1c$, $2c$ formed # LINEAR ROLLER BEARING WITH RACK AND PINION

BACKGROUND OF THE INVENTION

1. Field of the Invention

The present invention relates to a linear roller bearing, in which rolling elements are interposed between a pair of raceway blocks (or so-called ways) formed with raceway grooves at longitudinal side-wall surfaces thereof to allow relative motion between the raceway blocks.

2. Description of the Prior Art

A conventional linear roller bearing, as shown in FIG. 8, consists of: a pair of ways 1, 2 parallelly facing each other and so set that they can move relative to each other; a cage 5 disposed between the way 1 and the way 2; and cylindrical rollers 7 supported in the cage 5 and interposed between a raceway groove 3 of the way 1 and a raceway groove 4 of the way 2. A longitudinally extending side-wall surface 1a of the way 1 is formed with a roughly V-shaped raceway groove 3 that has an upper raceway surface 3a, a lower raceway surface 3b and a cutter escape groove 3c. A longitudinally extending side-wall surface 2a of the way 2 is formed with a roughly V-shaped raceway groove 4 that has an upper raceway surface 4a, a lower raceway surface 4b and a cutter escape groove 4c. Longitudinal end surfaces of the ways 1, 2 are formed with threaded holes 9, and one of the ways 1, 2 is fitted with a stopper or end screw 10 to prevent a deviation of the cage 5. The ways 1, 2 have mounting surfaces 1b, 2b to be brought into contact with a base or table, and mounting holes 1c, 2c formed in the mounting surfaces 1b, 2b.

In this linear roller bearing, the cage 5 is normally made of a metal material and has roller retaining holes 6 formed therein at equal intervals. To support the cylindrical rollers 7 in the cage 5, claws 20 are cut and raised at the upper and lower edge portions of the roller retaining holes 6 in the cage 5 to hold the cylindrical rollers 7 in the roller retaining holes 6. The cylindrical rollers 7 are arranged in two directions so that adjacent ones cross each other.

This linear roller bearing has a simple structure, allows very high precision machining to be done to the raceway surfaces of the raceway grooves 3, 4, and incorporates in the cage 5 ultra-precise cylindrical rollers 7 whose diameter dimensions are strictly controlled. Because of these features, the linear roller bearing can provide a very smooth linear motion with very small friction resistance and therefore has found a wide range of applications with precision measuring devices and precision machining equipment.

The linear roller bearing mentioned above, however, has the possibility that the cage may slip or become dislocated when used under conditions where the stroke frequency of the ways is high and where the bearing is subjected to vibrations and unequally distributed load. For this reason, a stopper or end plate provided at the longitudinal ends of the ways against which the cylindrical rollers carried in the cage abut cannot be eliminated. Especially when the pair of ways move relative to each other, the cage also move relative to the ways. The relative motion of the cage with respect to the ways is not uniform, causing the cage to deviate or slip from the ways, so that it is difficult to maintain the cage in an appropriate position with respect to the ways.

Japanese Utility Model Laid-Open No. 89523/1987 discloses a sealing apparatus for a linear roller bearing. In this sealing apparatus for the linear roller bearing, the facing surfaces of two ways of square column are each formed with a longitudinally extending, roughly V-shaped raceway groove, with rolling elements carried in the cage trapped between the raceway grooves. The cage is a thin plate which has windows or roller retaining holes formed therein at equal intervals to hold the rolling members. At least the roller retaining holes at the ends of the cage are firmly fitted with a sealing member roughly the same in cross section as the rolling members.

SUMMARY OF THE INVENTION

A primary object of this invention is to solve the above-mentioned problems and to provide a linear roller bearing, which under the conditions where the stroke frequency of the ways is high and where the bearing is subjected to vibrations and unequally distributed load, the cage is prevented from slipping and getting out of the proper position with respect to the ways even when no stopper or end screw is provided, and which has no possibility of the cage from coming off the ways, assuring reliable and smooth relative motion of the ways at all times.

Another object of this invention is to provide a linear roller bearing, which comprises: a pair of ways having raceway grooves formed in longitudinally extending side-wall surfaces thereof; cylindrical rollers installed in a raceway between the raceway grooves of the ways; a plate-like cage disposed between the two ways to hold the cylindrical rollers in roller retaining holes formed therein; a rack installed in a cutter escape groove formed in the raceway groove; and a pinion in mesh with the rack and rotatably fitted in a gear supporting hole formed in the cage.

The raceway groove is formed like a letter V in cross section, consisting of an upper raceway surface, a lower raceway surface and a cutter escape groove formed between the upper and lower raceway surfaces.

In this linear roller bearing, because the pinion is in mesh with the rack, when the ways move relative to the cage, the pinion moves in mesh with the rack. Thus, the ways do not slip with respect to the cage, assuring reliable relative motion of the ways and preventing the cage, which holds the cylindrical rollers in the roller retaining holes, from coming off the end of the ways.

Further, in this linear roller bearing, the gear supporting hole straddles the roller retaining hole which is formed in the cage to hold the cylindrical roller in position. The pinion is mounted in the cage through a gear holder locked in the cage. The gear holder consists of: a shaft portion that rotatably supports the pinion; and first and second gear holder portions which are fitted in the roller retaining hole formed in the cage and which are disposed on both sides of the pinion and connected with each other by the shaft portion. The shaft portion is formed integral with one of the first and second gear holder portions, and the other gear holder portion is formed with a hole in which the shaft portion is fitted. Alternatively, the shaft portion is fitted in holes formed in both the first and second gear holder portions.

The linear roller bearing of this invention is characterized in that the longitudinally extending sidewall surfaces of the pair of ways are formed with roughly V-shaped raceway grooves; that the raceway grooves are disposed parallel to and facing each other; that the cage holding the cylindrical rollers is disposed between the raceway grooves of the ways; the rack is secured to the cutter escape groove formed in the raceway groove; and that the pinion mounted in the cage meshes with the rack. This structure prevents slippage between the ways and the cage even when the relative stroke frequency of the ways is high, assuring smooth reciprocating relative motion and reliable control of the ways.

In conventional products, when the stroke frequency of the ways is high and the bearing is subjected to vibrations and uneven load distribution, the cage may come off the ways. With the linear roller bearing of this invention, however, the ways move relative to the cage without slippage, so that the cylindrical rollers do not come off the end of the ways. Hence, there is no need to provide a stopper or end screw. Even when the stopper is provided to the ways, there is no possibility of the cylindrical rollers abutting against the stopper and being damaged.

This linear roller bearing can be manufactured by making simple and low-cost improvements to the existing roller bearings without degrading the function of the existing roller bearings. That is, the rack can be secured to the ways by utilizing the cutter escape groove formed in the existing roller bearing, and the pinion can be supported in the cage by making minor design changes, such as changing the roller retaining hole formed in the existing cage to the gear holder mounting hole and the pinion gear supporting hole.

DETAILED DESCRIPTION OF EMBODIMENTS

Figure 1:
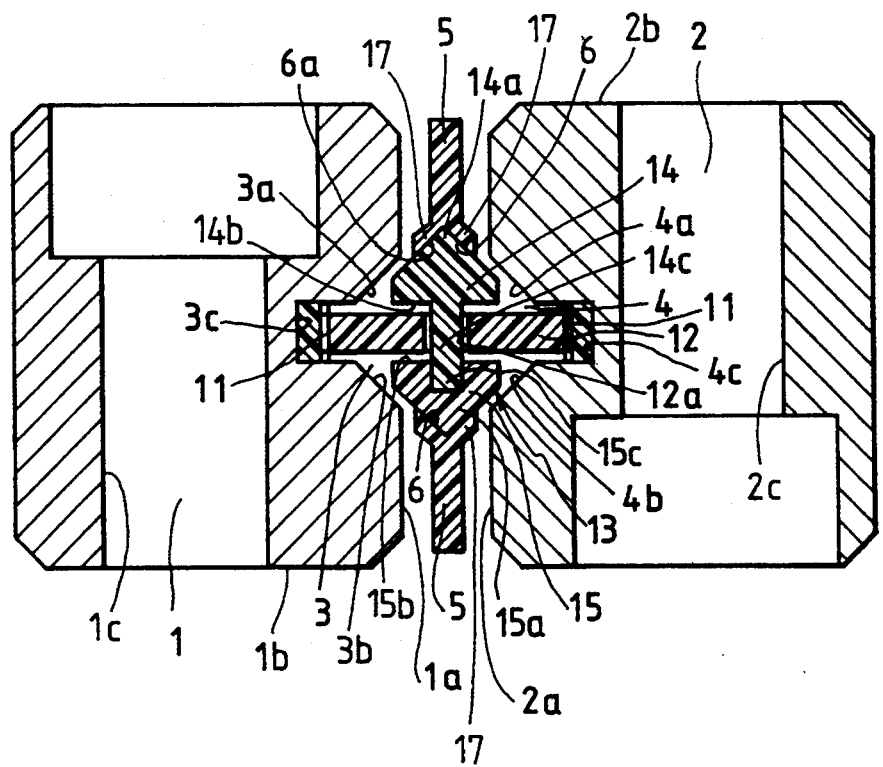
FIG. 1 is a cross section of the linear roller bearing as one embodiment of this invention.
Figure 2:
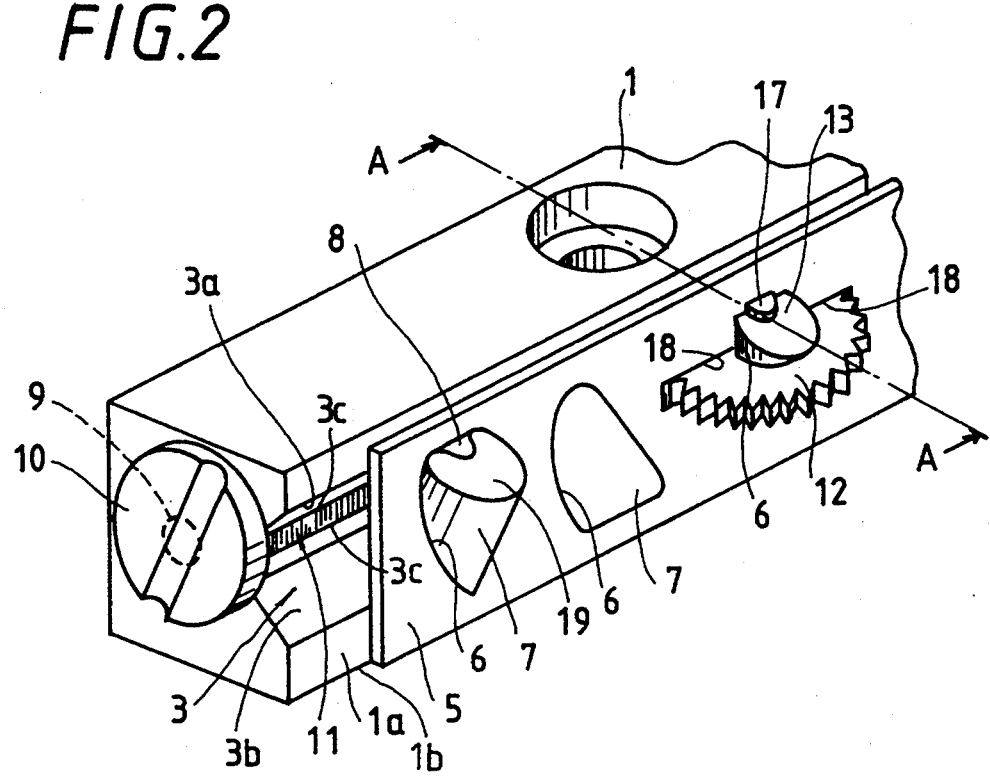
FIG. 2 is a perspective view of FIG. 1 showing the first embodiment of the linear roller bearing according this invention.
Figure 3:
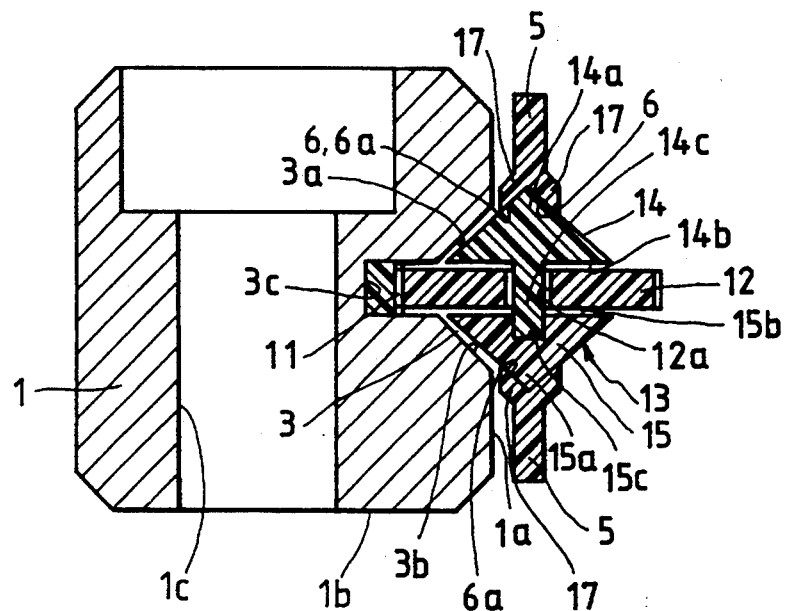
FIG. 3 is a cross section taken along the line A—A of FIG. 2 showing the first embodiment of this invention.
Figure 8:
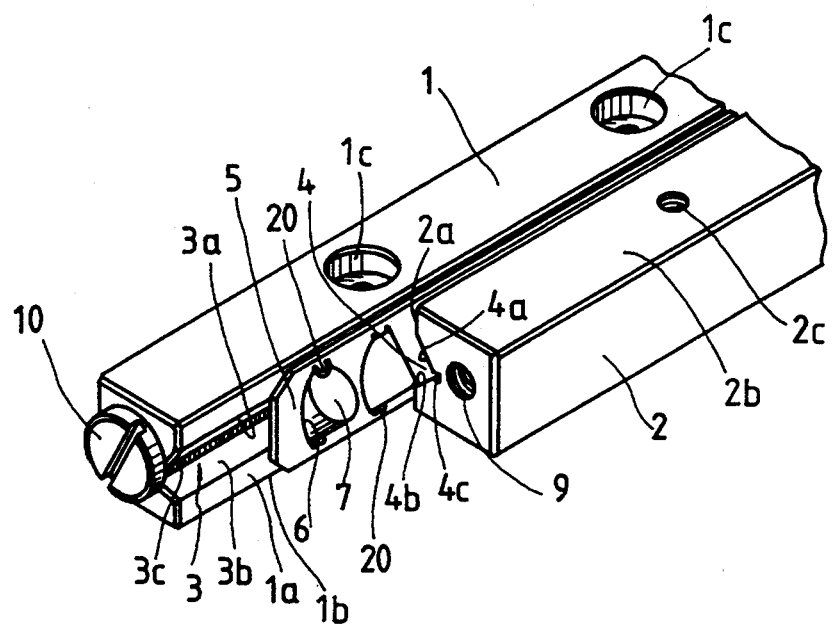
FIG. 8 is a perspective view showing one example of a conventional linear roller bearing.

Now, embodiments of the linear roller bearing according to this invention will be described by referring to the accompanying drawings. In FIG. 1 to FIG. 3, parts having the same functions as those shown in FIG. 8 are given like reference numerals.

The linear roller bearing comprises two ways 1, 2 and a cage 5 that holds a plurality of cylindrical rollers 7 therein. The ways 1, 2 have mounting surfaces 1b, 2b to be mounted to a base, table or component, and mounting holes 1c, 2c formed in the mounting surfaces 1b, 2b through which bolts are inserted. A longitudinally extending side-wall surface 1a of the way 1 is formed with a roughly V-shaped raceway groove 3 that consists of an upper raceway surface 3a, a lower raceway surface 3b, and a cutter escape groove 3c. A longitudinally extending side-wall surface 2a of the way 2 is formed with a roughly V-shaped raceway groove 4 that consists of an upper raceway surface 4a, a lower raceway surface 4b, and a cutter escape groove 4c. Cylindrical rollers 7 are installed in a raceway defined by the raceway grooves 3 and 4 of the ways 1, 2. The raceway grooves 3, 4 have the upper raceway surface 3a, 4a and the lower raceway surface 3b, 4b. The cutter escape grooves 3c, 4c are formed between the upper raceway surfaces 3a, 4a and the lower raceway surfaces 3b, 4b. The cylindrical rollers 7 arranged between the two ways 1, 2 are held in roller retaining holes 6 formed in the plate-like cage 5. If necessary, the longitudinal end surfaces of the ways 1, 2 may be formed with threaded holes 9 and one of the ways 1, 2 be provided with a stopper or end screw 10 that is screwed into the threaded hole 9 to prevent a deviation of the cage 5.

One of the structural features of this linear roller bearing is that a rack 11 is installed in the cutter escape grooves 3c, 4c formed in the raceway grooves 3, 4 and that a pinion 12 is rotatably fitted in a gear supporting hole 18 formed in the cage 5. The gear supporting hole 18 formed in the cage 5 straddles the roller retaining hole 6, i.e. crosses the hold 6 formed in the cage 5. A gear holder 13 holding the pinion 12 in position consists of a shaft portion 14c that rotatably supports the pinion 12, and an upper gear holder portion 14 (first gear holder portion) and a lower gear holder portion 15 (second gear holder portion), both of which are fitted in the roller retaining hole 6, are situated at both sides of the pinion 12 and are coupled together by the shaft portion 14c. That is, the pinion 12 is installed in the cage 5 through the gear holder 13 fitted in the cage 5.

Rigidly installed in the cutter escape grooves 3c, 4c formed in the ways 1, 2 are the racks 11 made of plastic or metal material, which mesh with the pinion 12 fitted in the gear supporting hole 18 formed in the cage 5. The cage 5 is made of an elastic thin plate material such as plastics and resilient metal plate and is formed with the roller retaining holes 6 at even intervals for holding the cylindrical rollers 7. The cylindrical rollers 7 are installed in the roller retaining holes 6 in such a way that the rotating axes of the adjacent rollers 7 cross each other. The cylindrical rollers 7 fitted in the roller retaining holes 6 are engaged at their end surfaces 19 with locking claws 8 formed at the upper and lower ends of the roller retaining holes 6.

The cage 5 is formed with the gear supporting hole 18 that straddles the roller retaining hole 6 in the cage 5 to accommodate the pinion 12 rotatably fitted over the gear holder 13. Thus, the roller retaining hole 6 in the cage 5 is fitted with the gear holder 13 and the gear supporting hole 18 is fitted with the pinion 12. The upper and lower end of the roller retaining hole 6 are formed with parallel V-shaped grooves 6a that extend longitudinally of the cage 5. On both sides of each V-shaped groove 6a, projections or locking claws 17 are formed at the longitudinal center of the groove to hold the gear holder 13. Although the locking claws 17 may be formed integral with the cage 5, they may also be formed as separate members and, after the gear holder 13 is fitted in the cage 5, the claws 17 may be secured to the sides of the cage 5 as by bonding so as to retain the gear holder 13 in position, as in another embodiment described later. The gear supporting hole 18 for the pinion 12 is formed slightly larger than the cross section of the pinion 12 so that the pinion 12 can rotate freely with respect to the cage 5.

The pinion 12 is rotatable with respect to the gear holder 13 fitted in the cage 5, and meshes with the racks 11, 11 secured to the cutter escape grooves 3c, 4c formed in the ways 1, 2. The pinion 12 and rack 11 may be made of a metal or plastics.

The gear holder 13 is made of a plastics and consists of the upper gear holder portion 14 and the lower gear holder portion 15, both of which are triangular in cross section. The ridgelines of vertices 14a, 15a extend parallel to planar portions 14b, 15b facing gear holder 13. At the center of the planar portion 14b of the upper gear holder portion 14, the shaft portion 14c that loosely fits in a center hole 12a of the pinion 12 is integrally formed. At the center of the planar portion 15b of the under gear holder portion 15, a hole 15c that receives the end of the shaft portion 14c is formed. That is, the shaft portion 14c of the gear holder 13 is formed integral with the upper gear holder portion 14, while the lower gear holder portion 15 has the hole 15c in which the shaft portion 14c is fitted. It is also possible to form the shaft portion integral with the lower gear holder portion 15 and cut a hole in the upper gear holder portion 14 in which the shaft portion is fitted. Although the cross section of the gear holder 13 is shown to be triangular, it may be changed according to the shape of the longitudinally extending side wall surfaces 1a, 2a of the ways 1, 2.

In the embodiment shown in FIGS. 1 to 3, the shaft portion 14c of the gear holder 13 projects integrally from the upper gear holder portion 14. Although the shaft portion 14 may be formed of the same plastics as is used in the upper and lower gear holder portions 14, 15, it can be formed of a metal.

In this linear roller bearing, mounting the pinion 12 in the cage 5 consists in fitting one vertex 15a of the gear holder 13, whose shaft portion 14c is loosely fitted in the pinion 12, into one V-shaped groove 6a of the roller retaining hole 6 in the cage 5 and then forcibly engaging the other vertex 14a into the other V-shaped groove 6a by elastically deforming the locking claws 17 of the second V-shaped groove 6a.

Figure 4:
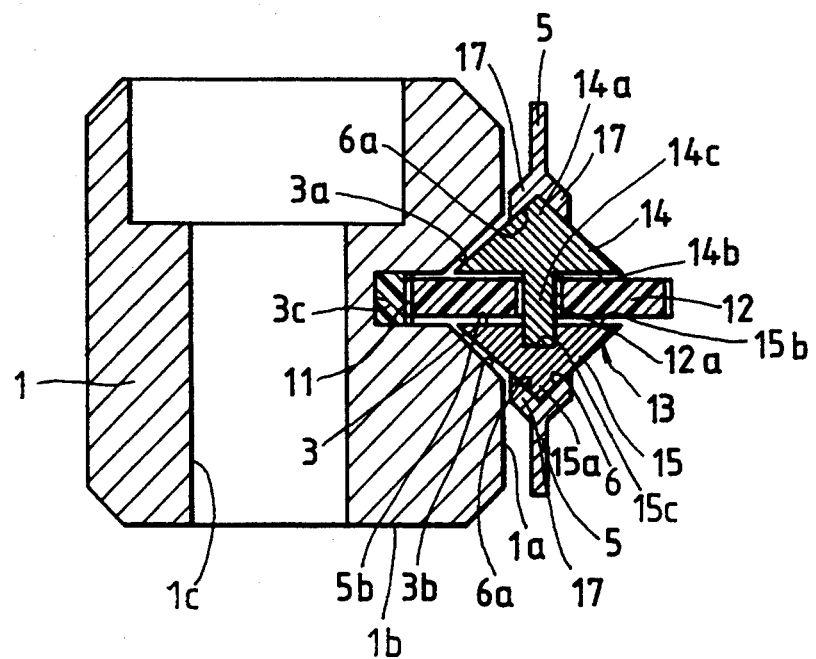
FIG. 4 is a cross section taken along the line A—A of FIG. 2 showing a second embodiment of this invention.

Next, a second embodiment of the linear roller bearing of this invention will be described by referring to FIG. 4. In FIG. 4, components having the same functions as those of FIG. 3 are assigned like reference numerals. In this embodiment, the cage 5 is formed of a thin plate material with rigidity. Where the gear holder 13 and pinion 12 are made of a material having rigidity, not only can the gear holder 13 be fitted forcibly into the cage 5 by elastically deforming the V-shaped groove 16a, but it can also be assembled into the cage 5 by thermally expanding the cage 5. When the gear holder 13 is made of a material having elasticity, such as plastics, one vertex 14a or 15a of the gear holder 13 is elastically deformed and forcibly fitted into the V-shaped groove 16a.

Figure 5:
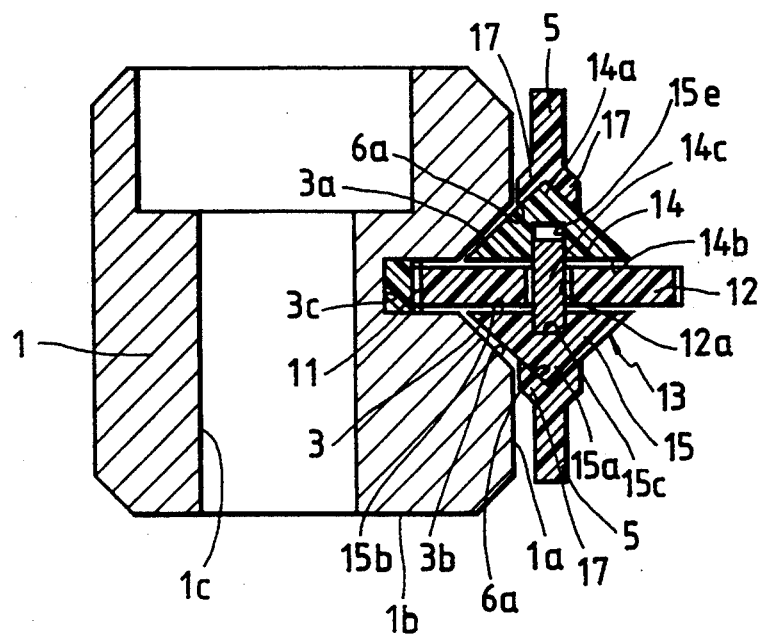
FIG. 5 is a cross section taken along the line A—A of FIG. 2 showing a third embodiment of this invention.

Next, a third embodiment of the linear roller bearing according to this invention will be described by referring to FIG. 5. In FIG. 5, components having the same functions as those of FIG. 3 are assigned like reference numerals. In this embodiment, the gear holder 13 consists of a separately formed shaft portion 14c, an upper gear holder portion 14 having a hole 15c formed at the center of its planar portion 14b, and a lower gear holder portion 15 having a hole 15c formed at the center of its planar portion 14b. The gear holder 13 is assembled by fitting the ends of the shaft portion 14c into the holes 15c of the upper and lower gear holder portions 14, 15. In the gear holder 13 of this embodiment, while the shaft portion 14c and the upper and lower gear holder portions 14, 15 may be formed of plastics, it is possible to use a metal to form only the shaft portion 14c.

Figure 6:
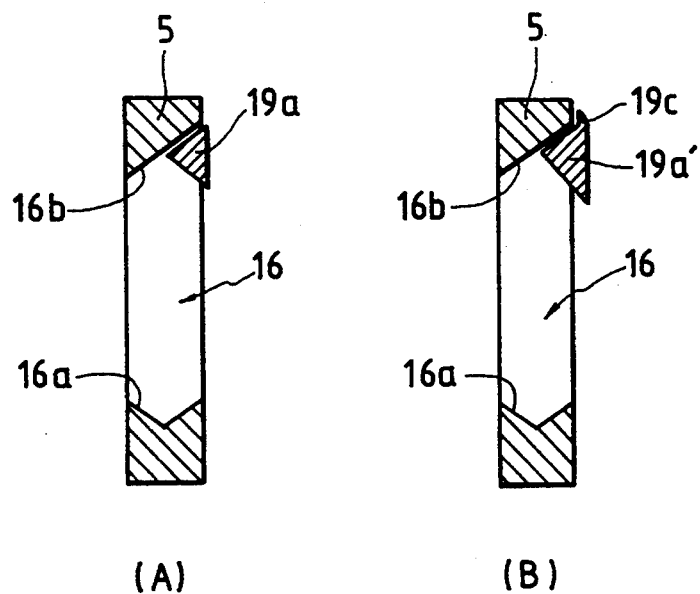
FIGS. 6(A & B) is a cross section showing another embodiment of the cage in the linear roller bearing.
Figure 7:
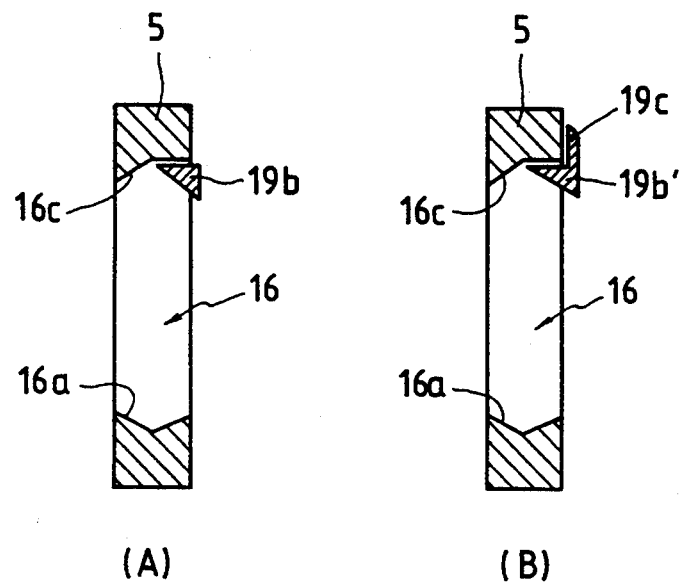
FIGS. 7(A & B) is a cross section showing still another embodiment of the cage in the linear roller bearing.

Now, various examples of cage 5 that can accommodate the gear holder 13 are described by referring to FIGS. 6 and 7.

The cage 5 shown in FIG. 6(A) has a mounting hole 16 in place of the roller retaining hole 6 of FIG. 1, to mount the gear holder 13. One of V-shaped grooves 16a that define the mounting hole 16 is formed by an inclined surface 16b, whose end portion is securely fitted with a separately fabricated locking piece 19a of triangular column to form a V-shaped groove 16a. The gear holder 13 whose shaft portion 14c is loosely fitted in the pinion 12 is inserted inside the V-shaped groove 16a and the inclined surface 16b of the mounting hole 16, and then the locking piece 19a is secured to the inclined surface 16b to assemble the gear holder 13 in the cage 5.

In the cage 5 shown in FIG. 6(B), the locking piece 19a is formed at its side with an engagement edge 19c that engages with the outer surface of the cage 5 to help the locking piece 19a easily attach to the cage 5.

The cage 5 shown in FIG. 7(A) is formed with a mounting hole 16 in stead of the roller retaining hole 6 of FIG. 1, to accommodate the gear holder 13. The mounting hole 16 has its one-half on the gear holder insertion side formed planar and the other half as an inclined surface 16c. A separately fabricated locking piece 19b of triangular column is installed from the planar side and fixed there to form a V-shaped groove.

Alternatively, the cage 5 shown in FIG. 7(B) is formed at its side with a contact edge 19c that comes into contact with the outside of the cage 5 to help the locking piece 19b easily attach to the cage 5. The structure of the V-shaped groove 16a is not limited to those shown in FIGS. 6 and 7.

I claim:

1. A linear roller bearing comprising:
    a pair of ways having mounting holes formed therein and raceway grooves formed in longitudinally extending side-wall surfaces thereof, each of the raceway grooves comprising an upper raceway surface, a lower raceway surface and a cutter escape groove between the upper and lower raceway surfaces;
    cylindrical rollers installed in a raceway formed between the raceway grooves of the ways;
    a plate-like cage arranged between the ways and having roller retaining holes formed therein to hold the cylindrical rollers;
    a rack installed in the cutter escape groove formed in each of the raceway groove;
    a pinion in mesh with the rack and rotatably disposed in a gear supporting hole formed in the cage; and
    a gear holder locked in the cage to rotatably support in the cage the pinion which is rotatably disposed in the gear supporting hole.

2. A linear roller bearing according to claim 1, wherein the gear supporting hole formed in the cage crosses the roller retaining holes formed in the cage.

3. A linear roller bearing according to claim 1, wherein the gear holder comprises: a shaft portion for rotatably supporting the pinion; and a first gear holder portion and a second gear holder portion, both of which are fitted in one of the roller retaining holes formed in the cage, are disposed on both sides of the pinion and are connected together by the shaft portion.

4. A linear roller bearing according to claim 3, wherein the shaft portion and the first gear holder portion are formed integral in one piece, and the second gear holder portion is formed with a hole in which the shaft portion is fitted.

5. A linear roller bearing according to claim 3, wherein the shaft portion is fitted in holes formed in the first gear holder portion and the second gear holder portion.

6. A linear roller bearing according to claim 5, wherein the shaft portion is made of a metal and the first gear holder portion and the second gear holder portion are formed of plastics.

7. A linear roller bearing according to claim 1, wherein the gear holder is made of plastics.

8. A linear roller bearing according to claim 1, wherein the gear holder is made of an elastic metal plate.

9. A linear roller bearing according to claim 1, wherein the pinion and the rack are made of plastics.

10. A linear roller bearing according to claim 1, wherein the pinion and the rack are made of metal.

* * * * *